(12) United States Patent
Peinemann et al.

(10) Patent No.: US 10,696,025 B2
(45) Date of Patent: Jun. 30, 2020

(54) ASYMMETRIC POLYMERIC MEMBRANES CONTAINING A METAL-RICH DENSE LAYER WITH A CONTROLLED THICKNESS AND METHOD OF MAKING SAME

(71) Applicant: KING ABDULLAH UNIVERSITY OF SCIENCE AND TECHNOLOGY, Thuwal (SA)

(72) Inventors: Klaus-Viktor Peinemann, Thuwal (SA); Luis Francisco Villalobos Vazquez de la Parra, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 294 days.

(21) Appl. No.: 15/326,750

(22) PCT Filed: Jul. 13, 2015

(86) PCT No.: PCT/IB2015/001395
§ 371 (c)(1),
(2) Date: Jan. 17, 2017

(87) PCT Pub. No.: WO2106/009272
PCT Pub. Date: Jan. 21, 2016

(65) Prior Publication Data
US 2017/0210101 A1    Jul. 27, 2017

Related U.S. Application Data

(60) Provisional application No. 62/026,152, filed on Jul. 18, 2014.

(51) Int. Cl.
*B32B 27/06* (2006.01)
*B01D 67/00* (2006.01)
(Continued)

(52) U.S. Cl.
CPC ........ *B32B 27/065* (2013.01); *B01D 67/0079* (2013.01); *B01D 69/02* (2013.01);
(Continued)

(58) Field of Classification Search
None
See application file for complete search history.

(56) References Cited

U.S. PATENT DOCUMENTS 3,954,607 A * 5/1976 Halling .............. B01D 67/0093
                                              210/654
5,670,051 A * 9/1997 Pinnau ................. B01D 53/228
                                              210/500.27
(Continued)

FOREIGN PATENT DOCUMENTS

JP    2010-188282    *  9/2010
JP    2010188282 A      9/2010
(Continued)

OTHER PUBLICATIONS

Pieter Vandezande et al., "Solvent resistant nanofiltration: separating on a molecular level", Chem. Soc. Rev., vol. 37, p. 365-405, 2008.*
(Continued)

*Primary Examiner* — Matthew J Daniels
*Assistant Examiner* — Mohammad M Ameen
(74) *Attorney, Agent, or Firm* — Billion & Armitage; Gregory S. Schwartz

(57) ABSTRACT

A structure, and methods of making the structure are provided in which the structure can include: a membrane having a first layer and a second layer, the first layer comprising polymer chains formed with coordination complexes with metal ions, and the second layer consisting of a porous support layer formed of polymer chains substantially, if not completely, lacking the presence of metal ions. The structure
(Continued)

100

110, dense layer (polymer matrix with a high loading of metal ions)

120, porous support (no metal present here)

130, macrovoids can be an asymmetric polymeric membrane containing a metal-rich layer as the first layer. In various embodiments the first layer can be a metal-rich dense layer. The first layer can include pores. The polymer chains of the first layer can be closely packed. The second layer can include a plurality of macro voids and can have an absence of the metal ions of the first layer.

14 Claims, 8 Drawing Sheets

(51) Int. Cl.

| | |
|---|---|
| *B01D 69/10* | (2006.01) |
| *B01D 69/12* | (2006.01) |
| *B01D 71/76* | (2006.01) |
| *B01D 71/58* | (2006.01) |
| *B01D 69/02* | (2006.01) |
| *B01D 71/62* | (2006.01) |
| *B29C 37/00* | (2006.01) |
| *B29C 41/22* | (2006.01) |
| *B29C 44/12* | (2006.01) |
| *B32B 5/32* | (2006.01) |
| *B29L 31/00* | (2006.01) |

(52) U.S. Cl.
CPC .............. *B01D 69/10* (2013.01); *B01D 69/12* (2013.01); *B01D 71/58* (2013.01); *B01D 71/62* (2013.01); *B01D 71/76* (2013.01); *B29C 37/0025* (2013.01); *B29C 41/22* (2013.01); *B29C 44/1285* (2013.01); *B32B 5/32* (2013.01); *B01D 2323/30* (2013.01); *B01D 2325/10* (2013.01); *B29L 2031/755* (2013.01)

(56) References Cited

U.S. PATENT DOCUMENTS

| | | | | |
|---|---|---|---|---|
| 9,914,099 | B2 * | 3/2018 | Peinemann | B01D 67/0011 |
| 2012/0318741 | A1 * | 12/2012 | Peinennann | B01D 67/0011 |
| | | | | 210/650 |
| 2013/0341273 | A1 * | 12/2013 | Weber | B01D 71/68 |
| | | | | 210/644 |
| 2014/0044884 | A1 * | 2/2014 | Berthelot | C09D 4/00 |
| | | | | 427/508 |

FOREIGN PATENT DOCUMENTS

| | | | |
|---|---|---|---|
| WO | 2012177465 | A1 | 12/2012 |
| WO | WO-2012-177465 | A1 * | 12/2012 |
| WO | 2013122247 | A1 | 8/2013 |

OTHER PUBLICATIONS

International Search Report and Written Opinion of Application No. PCT/IB2015/001395 dated Dec. 7, 2015, 11 pages.

Villalobos L. F. et al.: "Poly-thiosemicarbazidejgold nanoparticles catalytic membrane: In-situ growth of well-dispersed, uniform and stable gold nanoparticles in a polymeric membrane", Catalysis Today, Elsevier, NL, vol. 236, Dec. 8, 2013 (Dec. 8, 2013), pp. 92-97, XP029046266.

Luis Francisco Villalobos et al.: "Complexation-Induced Phase Separation: Preparation of Composite Membranes with a Nanometer-Thin Dense Skin Loaded with Metal Ions", Nano Letters, vol. 15, No. 5, May 13, 2015 (May 13, 2015), pp. 3166-3171, XP055229257.

* cited by examiner

ASYMMETRIC POLYMERIC MEMBRANES CONTAINING A METAL-RICH DENSE LAYER WITH A CONTROLLED THICKNESS AND METHOD OF MAKING SAME

CROSS-REFERENCE TO RELATED APPLICATIONS

This application is the National Stage of International Application No. PCT/IB2015/001395, filed 13 Jul. 2015, which claims the benefit of and priority to U.S. Provisional Application Ser. No. 62/026,152, having the title "ASYMMETRIC POLYMERIC MEMBRANES CONTAINING A METAL-RICH DENSE LAYER WITH A CONTROLLED THICKNESS AND METHOD OF MAKING SAME," filed on 18 Jul. 2014, the entire disclosures of which are incorporated by reference in their entireties as if fully set forth herein.

TECHNICAL FIELD

The present disclosure generally relates to polymeric membranes, in particular asymmetric polymeric membranes containing a metal-rich dense layer with a controlled thickness and methods of making the membranes.

BACKGROUND

The vast majority of membranes used in industry are fabricated by a phase inversion process because it is simple and easy to scale up. However, one of the big limitations of phase inversion processes is the inefficient way of adding fillers to the membrane. The fillers are in the casting solution, and end up not only in the dense layer where they are needed, but also all over the porous support layer. This is not economically feasible, especially for the case of expensive fillers like metal ions or metal nanoparticles.

Accordingly, there is a need to address the aforementioned deficiencies and inadequacies, among others discussed below.

SUMMARY

The present disclosure provides asymmetric polymeric membranes, in particular membranes containing a metal-rich layer that can be a dense layer with controlled thickness and methods of making the membranes. In various embodiments, the metal-rich dense layer can include closely packed polymer chains formed with coordination complexes with metal ions (polymer-metal complexes).

The present method of making the membranes provides for the first time a phase inversion process capable of a controlled dispersion of metal ions just in the dense layer of asymmetric membranes. Moreover, the nature of the process allows for the independent optimization of the dense layer and the support layer. The present process brings the major advantages of composite membranes to a simpler and more scalable phase inversion process, that allows the fabrication of the preferred hollow fiber configuration. With the present method, asymmetric hollow fibers consisting of a dense layer full of metal ions resting over a porous support layer can be fabricated in a single step with a minimum amount of the usually expensive metal. The incorporation of such high amount of well-dispersed metal ions into the membrane's dense layer provides applications in areas such as facilitated transport, fouling control or catalysis.

Previously known phase separation techniques to form membranes have one thing in common. They work by changing the conditions around the polymer chains making them insoluble, therefore provoking a phase separation. Phase separation is induced by a change in temperature, a decrease in solvent concentration or an addition of a non-solvent to the system. On the contrary, the present method works by modifying the polymer chains making them insoluble in the original conditions. Certain polymers that are able to coordinate with metal ions become suddenly insoluble once they complexes with a metal ion.

The present method provides an economically feasible process to fabricate metal-containing polymeric membranes at a large-scale. The method can be easily done with slight modifications to existing industrial set-ups.

The present method allows for the fabrication of asymmetric polymeric membranes consisting of a layer having metal ions and a porous support layer in which the metal ions are substantially absent. In various aspects the layer having metal ions is a dense layer formed with coordination complexes with the metal ions. Moreover the thickness of the dense layer can be easily controlled. The method can be done in any of the current industrial facilities to fabricate membranes via phase inversion by making only slight modifications.

A number of publications report the exceptional performance of polymeric membranes containing metal ions or metal nanoparticles for applications like facilitated transport, catalysis or bio-fouling control. However, none of these membranes have made it to the industry. The main reason for this is the inefficient use of the metal ions or nanoparticles in current fabrication processes. Ideally the metal nanoparticles or metal ions should be located only in the top thin layer and not in the porous support, because the metals are expensive and there is no use for them in the support. This limits the application of the preferred phase separation methods for the fabrication of membranes containing metal ions and metal nanoparticles because there is no method available so far that can concentrate the metal only in the dense layer during the phase separation.

The current state-of-the-art methods for concentrating the metal ions or metal nanoparticles in the dense layer are the preparation of composite membranes via interfacial polymerization, dip coating or spin coating and including the desired metal ion or nanoparticle on either the polymer solution to be coated, or in one of the phases (organic or aqueous) of the interfacial polymerization process. These methods are more complex than the present phase inversion process because they require fabrication of the support and the dense layer in different steps. Moreover the metal loading of metal ions or metal nanoparticles without agglomeration achieved by these methods is quite low. A simpler method able to achieve higher loadings is highly desired.

The present method provides a solution to this issue and provides for the fabrication of membranes with a new set of properties. It also combines the simplicity of a phase inversion process with the advantages of a composite membrane, independent optimization of the support and the dense layer and efficient use of expensive materials.

In an embodiment, a structure is provided. The structure can comprise a membrane having a first layer and a second layer, the first layer being a dense layer and comprising polymer chains forming coordination complexes with metal ions, and the second layer consisting of a porous support layer formed of polymer chains lacking the presence of metal ions. The first layer can be a dense metal-rich layer. The first layer can include pores.

In an embodiment, a method of making a structure is provided. The method can comprise: (i) forming a solution of a polymer and a solvent and casting a film with the polymer solution; (ii) immersing the polymer solution film in a first bath having a solvent, the solvent containing a concentration of metal ions; and (iii) placing the film resulting from the immersing in a second bath that is a non-solvent bath.

In any one or more aspects, the structure made or formed can be a hollow fiber, a particle, or a film. The solvent can include a low concentration of metal ions such that the polymer chains of a top layer of the polymer solution form polymer-metal complexes with the metal ions and cause a phase separation of a dense first layer of the structure including the polymer-metal ion complexes, the dense first layer acting as a barrier delaying diffusion of metal ions in the solvent of the first bath to the remaining polymer solution. The dense first layer can be a dense metal-rich layer. The dense first layer can include pores. The film resulting from the immersing in the second bath can cause precipitation of the remaining polymer solution film by solvent/non solvent exchange to form a second layer of the structure, the second layer comprising a porous support layer for the dense first layer. The second layer can consist of polymer chains lacking polymer-metal ion complexes. The solvent used in the first bath can be a solvent capable of dissolving a metal salt to form the metal ions and that does not cause the formed solution of the polymer and solvent to phase separate. The solvent can be selected from the group consisting of Dimethyl sulfoxide (DMSO), N-Methyl-2-pyrrolidone (NMP), Dimethylformamide (DMF), Dimethylacetamide (DMAc), and Acetonitrile (MeCN). The non-solvent bath can comprise water, methanol, ethanol and/or isopropanol.

In any one or more aspects of the structure and/or method, the polymer can be a polymer that forms intermolecular complexes with metal ions. The polymer can be selected from the group consisting of poly-thiosemicarbazide (PTSC), poly-thiourea (PTU), polybenzimidazole (PBI), polymers containing azole groups in their backbone, or azole groups as pendant groups, polyazoles, copolyazoles, polyoxadiazoles, poly(5-vinyl tetrazole), copolymers of 5-vinyl tetrazole with acrylonitrile, poly(N-alkyl-5-vinyl tetrazole)s, polysulfone bearing triazole functions, and tetrazole-containing polymers of intrinsic microporosity. The metal ions can be selected from the group consisting of palladium, gold, silver, platinum, copper, cobalt, nickel, iron, zinc, and mercury.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
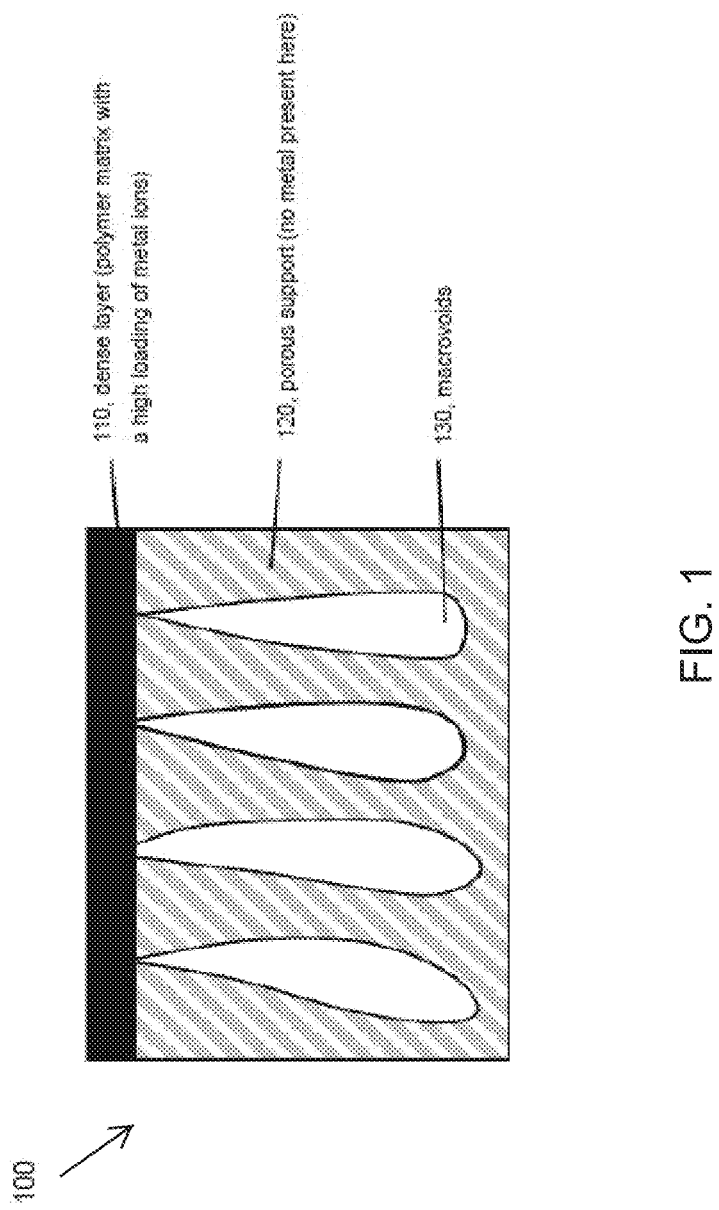
FIG. 1 depicts a diagram of a membrane obtained with a method of the present disclosure.

Described below are various embodiments of the present systems and methods for producing polymeric membranes, in particular asymmetric polymeric membranes containing a first layer that is a metal-rich layer, that can be a metal-rich dense layer with a controlled thickness, and a second layer that is a porous support layer in which the metal ions of the first layer are substantially, if not completely, absent. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

Embodiments of the present disclosure will employ, unless otherwise indicated, techniques of chemistry, synthetic organic chemistry, polymer chemistry, analytical chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in bar. Standard temperature and pressure are defined as 0° C. and 1 bar.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference as if fully set forth herein. Further, documents or references cited in this text, in a Reference List before the claims, or in the text itself; and each of these documents or references ("herein cited references"), as well as each document or reference cited in each of the herein-cited references (including any manufacturer's specifications, instructions, etc.) are hereby expressly incorporated herein by reference.

General Discussion

It is known that the addition of metal ions that form stable complexes with a given polymer can cause phase separation of such polymer. This is due to a crosslinking caused by complexation of several polymer chains to the same metal ion. This phenomenon has been used to produce reversible gels but not to precipitate a desired structure of solid polymer out of a solution. We use this phenomenon to precipitate out of solution a first layer, for example a dense, thin layer that will be the top layer of asymmetric membranes prepared with our method.

Not for the same purpose as in our method, but the formation of polymer-metal complexes has been used previously in the production of polymeric membranes. The polymer-metal complexes were used as a way of crosslinking the membrane to make it insoluble and resistant to swelling. To our knowledge, in none of the prior references is the formation of the polymer-metal complex used to precipitate a desired membrane structure out of the solution. In all cases the formation of the polymer-metal complex was a step unrelated to the formation of the membrane structure and had the only purpose of modifying the properties of an already formed membrane.

For the purposes of illustration only, and without limitation, embodiments of the present disclosure will now be described with particular reference to the below-described fabrication methods. Note that not every step in the process is described with reference to the process illustrated in the figures hereinafter. Therefore, the following fabrication processes are not intended to be an exhaustive list that includes every step required to fabricate the embodiments of the illustrated components. In addition, the steps of the process can be performed in a different order to accomplish the same result.

Embodiments of the present disclosure provide a structure, comprising: a membrane having a first layer and a second layer, the first layer comprising polymer chains formed with coordination complexes with metal ions, and the second layer consisting of a porous support layer formed of polymer chains substantially, if not completely, lacking the presence of metal ions. Thus, the structure can be an asymmetric polymeric membrane containing a metal-rich layer as the first layer. In various embodiments the first layer can be a metal-rich dense layer. The polymer chains of the first layer can be closely packed. In various embodiments, the membrane includes a porous support layer for a metal-rich dense, or closely packed, first layer. The second layer can include a plurality of macro voids and can have an absence of the metal ions of the first layer, in particular an absence of the polymer-metal ion complexes of the first layer. In various aspects, the polymer of the membrane is a polymer that forms intermolecular complexes with metal ions.

In various aspects the polymer can be selected from the group consisting of poly-thiosemicarbazide (PTSC), polythiourea (PTU), polybenzimidazole (PBI), polymers containing azole groups in their backbone, or azole groups as pendant groups, polyazoles, copolyazoles, polyoxadiazoles, poly(5-vinyl tetrazole), copolymers of 5-vinyl tetrazole with acrylonitrile, poly(N-alkyl-5-vinyl tetrazole)s, polysulfone bearing triazole functions, and tetrazole-containing polymers of intrinsic microporosit.

By polymers of intrinsic microporosity (PIMs) we mean polymers with no single bonds in the backbone about which free rotation can occur, but which incorporate sites of contortion giving the backbone an irregular, kinked shape, are unable to pack efficiently in the solid state and so trap sufficient free volume that they behave like molecular sieves (i.e., they are microporous according to the IUPAC definition, with effective pore dimensions <2 nm). A PIM can also be defined as a microporous material comprising organic macromolecules comprised of first generally planar species connected by rigid linkers having a point of contortion such that two adjacent first planar species connected by the linker are held in non-coplanar orientation, subject to the proviso that the first species are other than porphyrinic macrocycles. Particular examples of tetrazole-containing PIMs include: PIM-1 substituted with tetrazole groups (TZ-PIM), and PIM-1 substituted with methyl tetrazole groups (MTZ-PIM). A more detailed discussion of PIMs or PIM-type materials including in particular PIM-1, can be found in U.S. Pat. No. 8,623,928, which is incorporated by reference as if fully set forth herein.

In general any polymer that contains functional groups that are capable of forming coordination complexes with metal ions can be suitable. Some of these functional groups are depicted below.

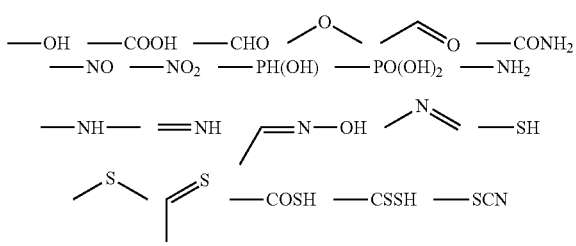

In various aspects the metal ions can be selected from the group consisting of transition metal ions. The metal ions can be selected from the group including palladium, gold, silver, platinum, copper, cobalt, nickel, iron, zinc, and mercury.

FIG. 1 depicts a diagram of exemplary membranes obtained with our method. In one or more embodiments, the membranes 100 include two layers of the same polymer: a first layer 110 on the top; and a second layer 120 beneath it. The first layer 110 can consist of closely packed polymer chains forming coordination complexes with metal ions (polymer-metal complexes). The first layer can also include pores. The second layer can be a porous support layer formed by polymer chains only, with no metal ions present. Second layer 120 could, but need not, include a plurality of macro voids 130. The presence of these macro voids depends on the interactions between the solvent of the polymer solution, the non-solvent used in the second bath (described below) and the polymer. Advantages of the process for making the membranes include: (i) the thickness of the dense layer can be easily controlled, and (ii) a high concentration of metal ions can be precisely and homogeneously incorporated only in the first layer, avoiding their presence in the porous support second layer. In various aspects, the thickness of the first layer can be controlled over several orders of magnitude, from less than 15 nm to more than 6500 nm.

The first layer 110 can be a metal-rich dense layer. We use both terms "dense" and "closely packed" interchangeably to describe the same situation: namely, polymer chains that are very close to each other so they occupy a space close to the minimum possible. The space they occupy will depend on the nature of the polymer. Polymers with bulky groups will allow more space (free volume) in-between their polymer chains when compared to polymers with small functional groups. Interactions between polymer chains and mobility of these chains will also play a role in determining how much free volume is present the final conformation.

We use the term "dense", as in dense film to refer to the absence of voids, for example an absence of voids >~5 angstroms in diameter within the typical structure. However, the thin skins of the membranes described herein, although dense on the whole, invariably contain a few large defects. Good practices during the preparation of the membranes, such as filtering the polymer solution prior to the casting step or delicate handling of the membranes when transferring them from the first bath to the second bath (described below) greatly reduces the presence of these defects. These defects could be sealed in order to achieve a better performance. For example, coating membranes with a thin layer of the very permeable polymer like polydimethylsiloxane (PDMS) in order to seal the defects is a common practice in the fabrication of membranes for gas phase separations. Our use of the term "dense" to describe the first layer in various aspects is not meant to exclude the possibility that the first layer can include pores.

In one or more embodiments, our present methods for producing the membranes use a polymer with functional groups that can form complexes with metal ions, and a solvent for this polymer that is capable of dissolving the metal salt of the desired metal to be dispersed in the first layer. In one or more embodiments, we use the same solvent used to prepare the polymer solution, assuming this solvent is able to dissolve metal salts.

In one or more embodiments, a method is provided, including: (i) forming a polymer solution (polymer+solvent A) and casting a thin with the polymer solution; (ii) immersing the polymer solution film in a first bath having the same solvent A (or another solvent capable of dissolving the desired metal salt and that does not cause the original polymer solution to phase separate), the solvent containing a low concentration of metal ions; and (iii) placing the resulting film in a non-solvent bath (second bath). In various aspects, water can be used as the non-solvent bath, as well as methanol, ethanol and/or isopropanol.

In various aspects, the casting of the polymer solution film results in a thin film of the polymer solution. By "thin" we mean a film having thickness from about 1 μm to about 1000 μm, for example from 100 μm to 350 μm. The viscosity of the cast polymer solution film can vary. In various aspects the viscosity can be high enough to allow the casting of a film. The viscosity is a sign of entanglement of polymer chains, which favor the formation of intermolecular complexes during the step of immersion of the film in the bath containing the ions.

During the immersion of the polymer solution film the polymer chains on the top layer of the viscous polymer solution film form complexes with the metal ions, crosslinking and swiftly phase separating, to form the first layer 110 including polymer-metal ion complexes that floats over the remaining viscous polymer solution film. This first layer acts as a barrier delaying the diffusion of metal ions to the polymer solution beneath it. By changing the type of metal ion, metal concentration and contact time, the thickness of the first layer 110 can be controlled.

Finally, during the second bath (the non-solvent bath), the remaining polymer solution below the first layer 110 is precipitated by solvent/non-solvent exchange to form the second layer 120, for example a porous support layer. The structure produced by the method can be a film, a particle, or a hollow fiber.

In the case of hollow fiber spinning, the method can be done in one step, by contacting either the inner or the outer area of the fiber with the solution containing the metal ions and the other area with the non-solvent bath. A metal-rich dense layer will be located in the area that was in contact with the solution containing the metal ions.

Our method thus produces membranes in-between the area of integrally skinned and composite membranes. The membranes can include a very dense layer on the top and a porous layer beneath it. Both of the layers can be made of the same polymer but with completely different properties. In particular the method can produce an asymmetric membrane concentrating the metal ions just in the first layer 110, avoiding presence of the metal ions, in particular polymer-metal complexes, in the second layer 120. Additionally the loadings of metal ions in the first layer obtained by our method can be very high and present no agglomeration. For example, the loadings can reach up to 50 wt %. However, in many aspects the loadings may be close to 25 wt %. Moreover unprecedented control over the thickness of such dense layer can be achieved. The thickness can be controlled over several orders of magnitude by modifying very simple parameters (from less than 15 nm to more than 6500 nm).

Figure 2:
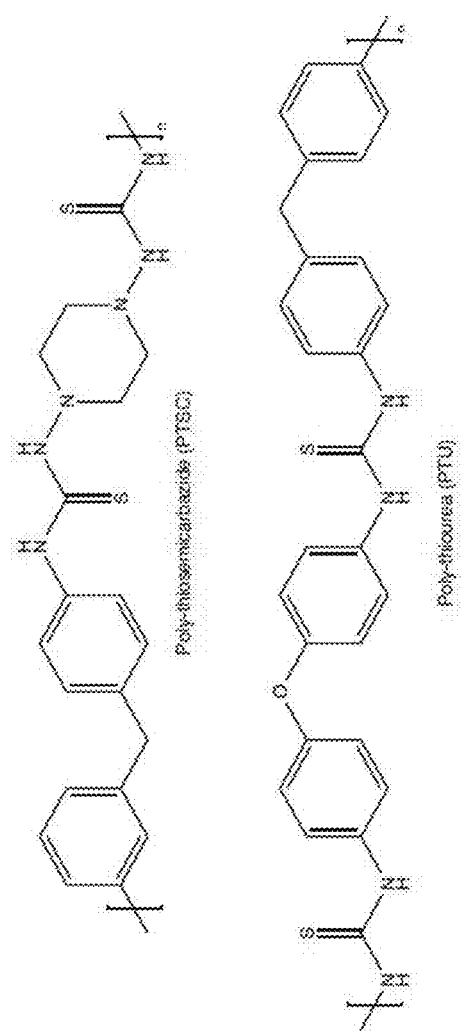
FIG. 2 depicts the structures of two polymers, namely poly-thiosemicarbazide (PTSC) and poly-thiourea (PTU), that can be used to produce membranes of the present disclosure.

Two polymers, a poly-thiosemicarbazide (PTSC) and a poly-thiourea (PTU) exemplify our membranes and our process of making the membranes. However in principle any polymer able to form intermolecular complexes with metal ions can be used. The structures of the two polymers are depicted in FIG. 2. Both are able to form strong complexes with several transition metal ions through the sulfur containing groups present in their backbones. In one or more embodiments, both polymers are prepared by a condensation reaction of equimolar quantities of their respective monomers in dimethyl sulfoxide (DMSO) at 50° C. for two days, followed by precipitation in hot water for two days and a drying step in the oven at 60° C. for another two days. The monomers are bis(4-isothiocyanatophenyl) methane and 4,4'-oxydianiline for PTU; and bis(4-isothiocyanatophenyl) methane and 1,4-diaminopiperazine for PTSC. Other suitable polymers include, but are not limited to polybenzimidazole (PBI) and some polymers of intrinsic microporosity like PIM-7.

Some of the parameters affecting the formation of the first layer 110, include:

Polymer solution concentration. This should be high enough to favor intermolecular complexes versus intramolecular ones. In various aspects, the polymer concentration can range from 5 wt % to 50 wt %. In other aspects, the polymer concentration can range from 15 wt % to 30 wt %.

Metal concentration in first immersion bath. Sufficiently high to create the necessary amount of crosslinks fast enough to fix the structure before the polymer chains start to escape (dissolve) to the bulk of the first bath. However, there may be a trade off because lower metal concentrations will give thinner layers as a result. In various aspects the "low concentration" of metal ions in the immersion solvent can range from 0.0005 M to the solubility limit of the chosen metal salt in the desired solvent. In other aspects the range can be from 0.0025 M to 0.015 M. Here "M" is defined as mol of metal ion/liter of solution.

Immersion time. The thickness of the dense layer can increase with the amount of time the polymer solution spends inside the first bath. In various aspects the immersion time can range from less than 1 second to 3000 seconds. In other aspects the immersion time can range from 1 second to 20 seconds.

Choice of metal. Metal ions that react faster with the functional groups of the polymer and that form more stable complexes will produce thinner dense layers. Exemplary metals include but are not limited to $Pd(OAc)_2$, $Cu(OAc)_2$, $Co(OAc)_2$, $AuCl_3$, $AgNO_3$, $Ag(OAc)$, $Co(OAc)$ and Bis(acetonitrile)dichloropalladium(II).

Choice of solvent for the first bath. The solvent should be able to dissolve the desired metal salt and also be a good solvent for the polymer to avoid phase separation during immersion. Exemplary solvents include not only dimethyl sulfoxide (DMSO), but also N-Methyl-2-pyrrolidone (NMP), Dimethylformamide (DMF), Dimethylacetamide (DMAc), and Acetonitrile (MeCN).

The parameters that favor formation of thinner dense layers are: metal ions that promote fast kinetics of complexation and the formation of stable complexes; low concentration of metal ions in the first bath; and a short immersion time in the metal solution (first bath).

Figure 3:
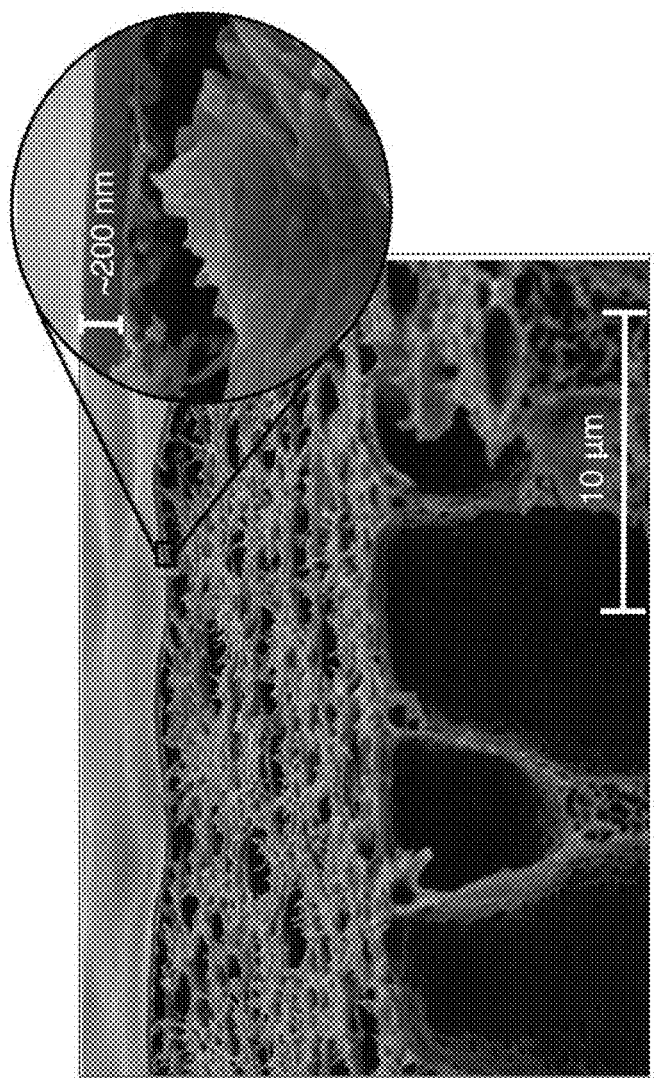
FIG. 3 depicts a cross-section SEM image of a PTSC asymmetric membrane with a Pd-rich dense layer of approximate 200 nm.
Figure 4:
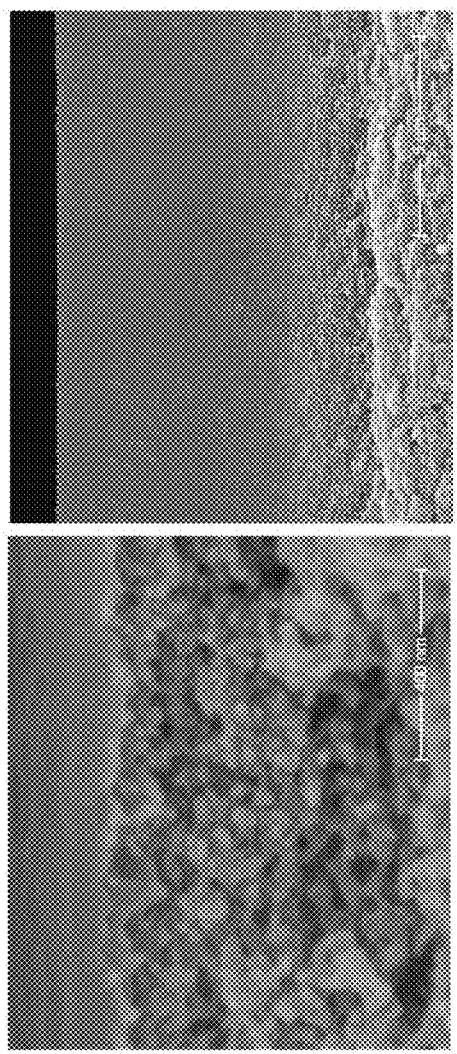
FIG. 4 depicts cross-section SEM image of a PTSC asymmetric membrane with: a) Ag-rich dense layer of 14±1 nm; and b) Co-rich dense layer of 6567±39 nm.

FIGS. 3 and 4 show SEM images of membranes obtained by our method. FIG. 3 depicts a cross-section SEM image of a PTSC asymmetric membrane with a Pd-rich dense layer of approximately 200 nm. The membrane was prepared by immersing a 15 wt % PTSC in DMSO film in a 10 mM $Pd(OAc)_2$ in DMSO solution for 5 seconds (first bath) and then transferring it to a water bath (second bath). FIG. 4 depicts a cross-section SEM image of a PTSC asymmetric membrane with: a) Ag-rich dense layer of 14±1 nm; and b) Co-rich dense layer of 6567±39 nm. A wide variety of metals can be deposited in the membrane's dense layer and the thickness can be easily controlled over a several orders of magnitude from less than 15 nm to more than 6500 nm.

EXAMPLES

Now having described the embodiments of the disclosure, in general, the following examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1. Preparation of Membranes with Different Thicknesses of a Copper-Rich Dense Layer Membranes were made using a polymeric solution of 15 wt % PTSC in DMSO as the casting solution. The resulting polymer solution was a viscous, yellow, honey-like liquid, which was allowed to settle for 5 hours until all the air bubbles had escaped, avoiding possible imperfections on the membrane. The general preparation process consisted of casting a 250-µm-thick polymer solution film with a membrane knife, followed by immersing it in a solution of $Cu(OAc)_2$ in DMSO to form the copper-rich dense layer.

Different concentrations of copper and different immersion times were used. The resulting membranes are presented in FIGS. 5 and 6 depicting the thickness of the dense layer of the membrane as a function of immersion time for different concentrations of $Cu(OAc)_2$.

Figure 5:
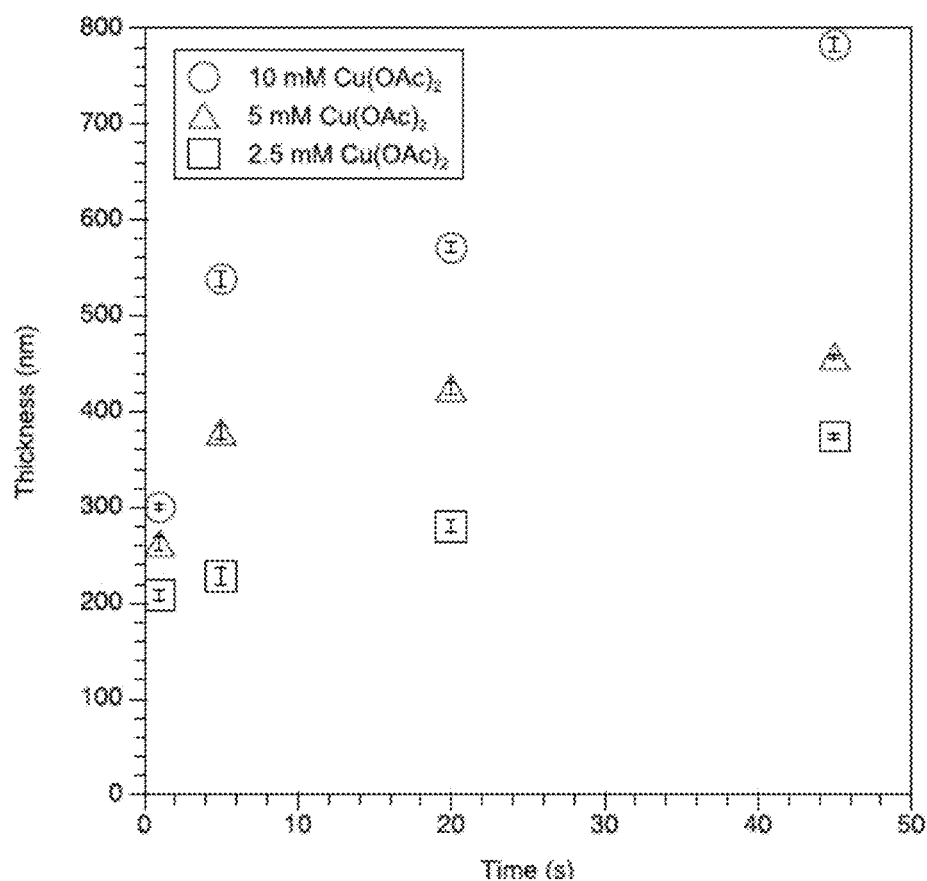
FIG. 5 depicts membranes prepared from a 15 wt % PTSC in DMSO solution and immersed in a first bath consisting of a solution of $Cu(OAc)_2$ in DMSO.
Figure 6:
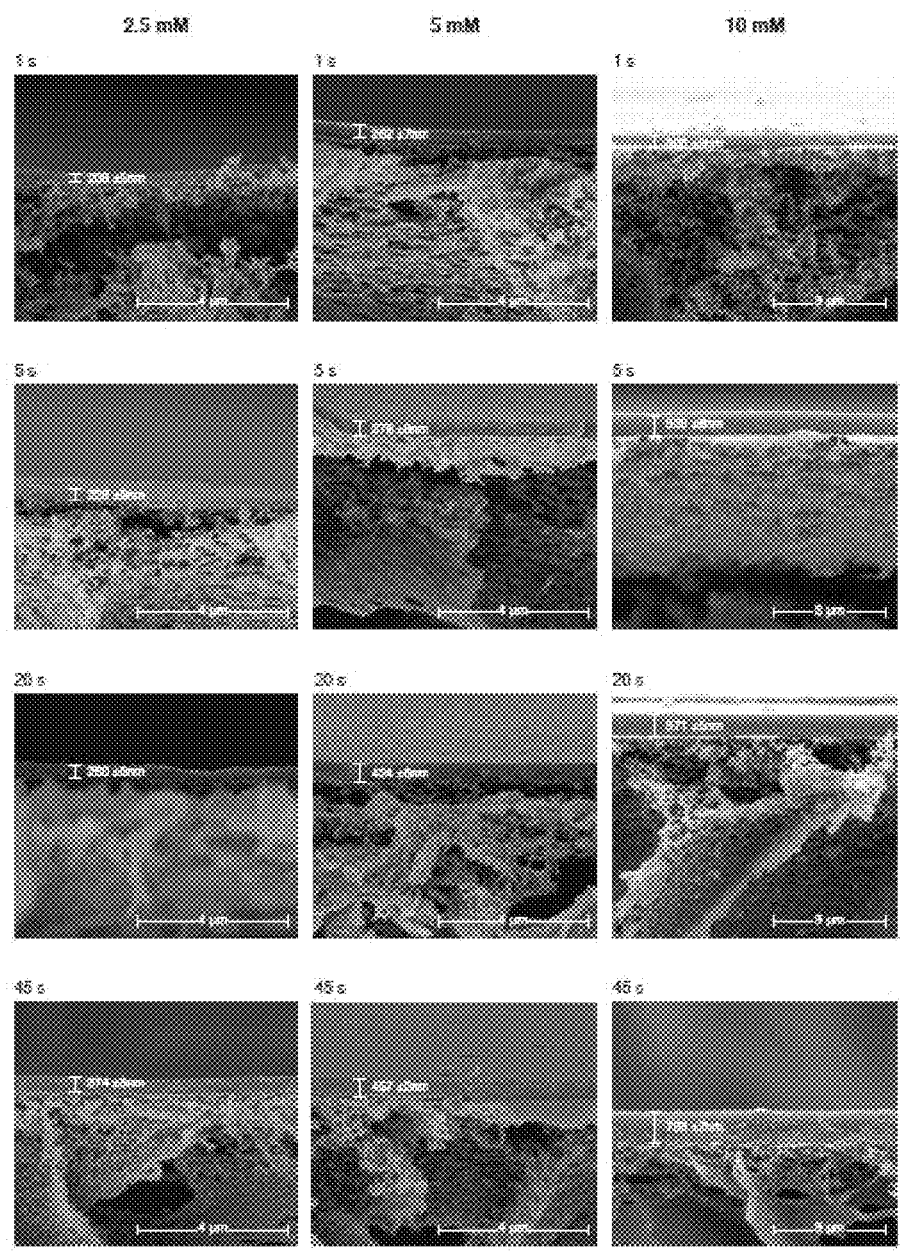
FIG. 6 depicts cross-section SEM images of membranes prepared from a 15 wt % PTSC in DMSO solution and immersed in a first bath of a solution of $Cu(OAc)_2$ in DMSO. The first column correspond to membranes immersed for certain amount of time in a 2.5 mM solution, the second column correspond to membranes immersed certain amount of time in a 5 mM solution, and finally the third column correspond to membranes immersed certain amount of time in a 10 mM solution.

FIG. 5 depicts membranes prepared from a 15 wt % PTSC in DMSO solution and immersed in a first bath consisting of a solution of $Cu(OAc)_2$ in DMSO. FIG. 6 depicts a cross-section of SEM images of membranes prepared from a 15 wt % PTSC in DMSO solution and immersed in a first bath of a solution of $Cu(OAc)_2$ in DMSO. The first column of FIG. 6 corresponds to membranes immersed for 1, 5, 20 and 45 seconds in a 2.5 mM solution. The second column corresponds to membranes also immersed for 1, 5, 20 and 45 seconds in a 5 mM solution. The third column corresponds to membranes immersed for the same time increments in a 10 mM solution. Finally they were transferred to a water bath to precipitate the porous support.

Example 2. Preparation of Membranes Using Different Metals for the Dense Layer

Figure 7:
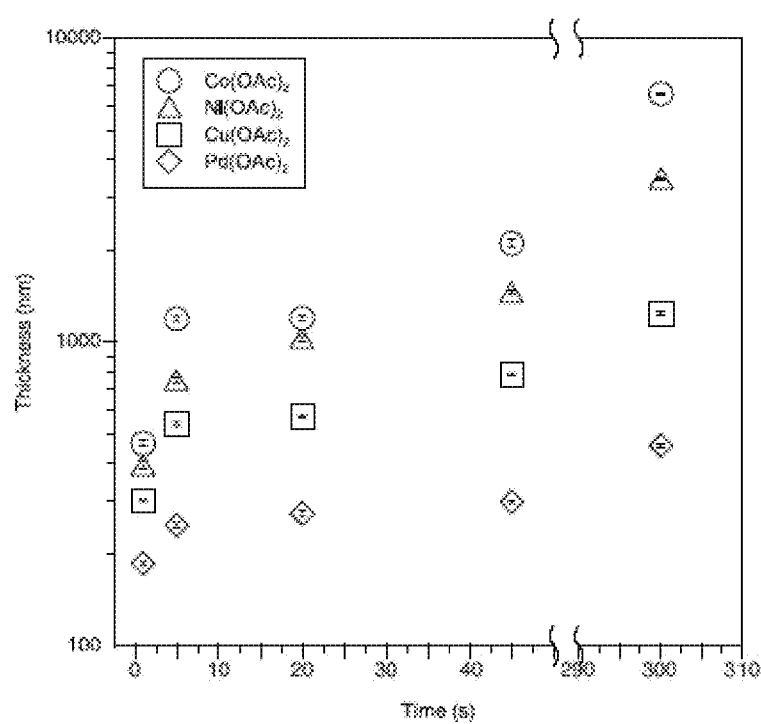
FIG. 7 depicts membranes prepared from a 15 wt % PTSC in DMSO solution and immersed in a 10 mM solution of different metal salts in DMSO.

Membranes were made using a polymeric solution of 15 wt. % PTSC in DMSO as the casting solution. The resulting polymer solution was a viscous, yellow, honey-like liquid, which was allowed to settle for 5 hours until all the air bubbles had escaped, avoiding possible imperfections on the membrane. The general preparation process consisted of casting a 250-μm-thick polymer solution film with a membrane knife, followed by immersing it in a 10 mM solution of different metal salts in DMSO to form the metal-rich dense layer. The metal salts used were $Co(OAc)_2$, $Ni(OAc)_2$, $Cu(OAc)_2$, and $Pd(OAc)_2$. For each metal salt different immersion times were tested: 1, 5, 20, 45 and 300 seconds. The metal salt used determines the metal present in the dense layer, and the amount of time spent inside the solution determines the thickness. Finally, the membranes were transferred to a water bath to precipitate the porous support layer 120. The resulting thicknesses of the dense layer as a function of immersion time for different metal salts are depicted in FIG. 7.

Example 3. Preparation of Membranes Using Different Polymers and Metals

Figure 8:
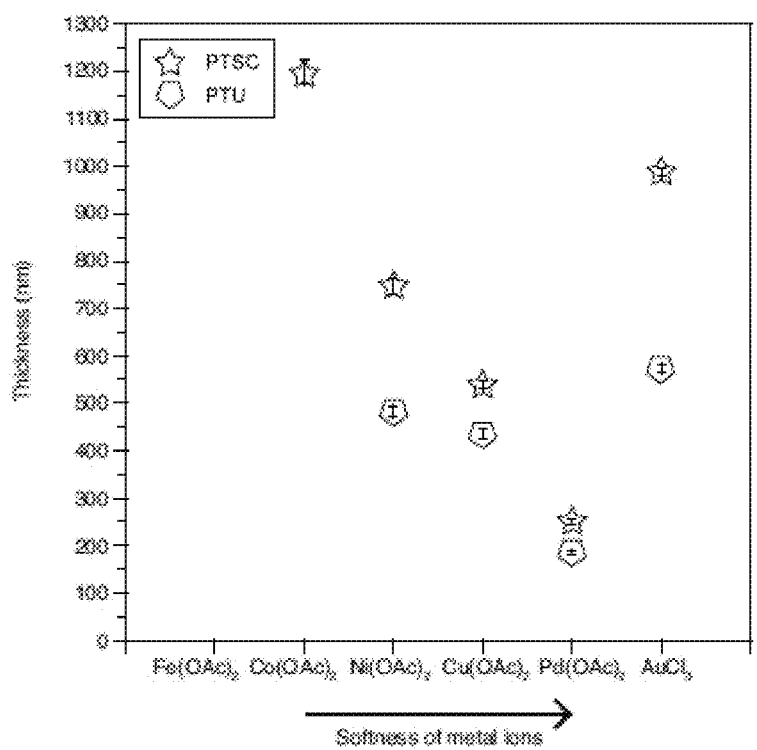
FIG. 8 depicts membranes prepared from a 15 wt % PTSC or PTU in DMSO solution, and immersed 5 seconds in a 10 mM solution of different metal salts in DMSO.

Membranes were made using a polymeric solution of 15 wt % PTSC in DMSO or 15 wt % PTU in DMSO as the casting solution. For both polymers the resulting solution was a viscous, yellow, honey-like liquid, which was allowed to settle for 5 hours until all the air bubbles had escaped, avoiding possible imperfections on the membrane. The general preparation process consisted of casting a 250-μm-thick polymer solution film with a membrane knife, followed by immersing it in a 10 mM solution of different metal salts in DMSO for 5 seconds to form the metal-rich dense layer. The metal salts used were $Fe(OAc)_2$, $Co(OAc)_2$, $Ni(OAc)_2$, $Cu(OAc)_2$, $Pd(OAc)_2$ and $AuCl_3$. Softer metal ions interact stronger with the functional groups of the polymers resulting in thinner dense layers. When the interaction is too weak the dense layer is not formed. This is the case of $Fe(OAc)_2$ for both polymers and $Co(OAc)_2$ for PTU. Finally they were transferred to a water bath to precipitate the porous support layer. The resulting thicknesses of the dense layer as a function of metal salt used for both polymers are depicted in FIG. 8.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the measuring technique and the numerical value. In addition, the phrase "about 'x' to 'y'" includes "about 'x' to about 'y'".

It should be emphasized that the above-described embodiments are merely examples of possible implementations. While some embodiments of the present disclosure have been shown and described herein, it will become apparent to those skilled in the art that many variations and modifications may be made to the above-described embodiments without departing from the principles of the present disclosure. All such modifications and variations are intended to be included herein within the scope of this disclosure and protected by the following claims.

The invention claimed is:
1. A method of making a structure, comprising:
 (i) forming a solution of a polymer and a first solvent, and casting the solution to form a viscous polymer solution film;
 (ii) immersing the viscous polymer solution film in a first bath having metal ions and a second solvent such that the metal ions react with a portion of the viscous polymer solution film to form a first layer of polymer-metal complexes, while also leaving an unreacted portion of the viscous polymer solution film; and
 (iii) placing the film resulting from step (ii) in a second bath comprising a non-solvent to cause the unreacted portion of the viscous polymer solution film to precipitate and form a second layer that is substantially free of metal ions.
2. The method of claim 1, where the structure formed is a hollow fiber, a particle, or a film.
3. The method of claim 1, wherein the first layer of polymer-metal complexes is a dense first layer and acts as a barrier delaying diffusion of metal ions in the second solvent of the first bath to the remaining polymer solution, thereby forming the unreacted portion of the viscous polymer solution film.
4. The method of claim 1, wherein the second layer comprises a porous support layer for the dense first layer.
5. The method of claim 1, wherein the second solvent is a solvent that is capable of dissolving a metal salt to form the metal ions and does not cause the formed solution of the polymer and solvent to phase separate.
6. The method of claim 1, wherein the polymer is a polymer that forms intermolecular complexes with metal ions.
7. The method of claim 6, wherein the polymer is selected from the group consisting of poly-thiosemicarbazide (PTSC), poly-thiourea (PTU), polybenzimidazole (PBI), polymers containing azole groups in their backbone, or azole groups as pendant groups, polyazoles, copolyazoles, polyoxadiazoles, poly(5-vinyl tetrazole), copolymers of

5-vinyl tetrazole with acrylonitrile, poly(N-alkyl-5-vinyl tetrazole)s, polysulfone bearing triazole functions, and tetrazole-containing polymers.

8. The method of claim 1, wherein the metal ions are selected from the group consisting of palladium, gold, silver, platinum, copper, cobalt, nickel, iron, zinc, and mercury.

9. The method of claim 1, wherein the first solvent and second solvent are selected from the group consisting of Dimethyl sulfoxide (DMSO), N-Methyl-2-pyrrolidone (NMP), Dimethylformamide (DMF), Dimethylacetamide (DMAc), and Acetonitrile (MeCN).

10. The method of claim 1, wherein the non-solvent bath comprises water, methanol, ethanol and/or isopropanol.

11. The method of claim 1, wherein the first solvent and the second solvent are the same.

12. The method of claim 1, wherein the first layer and the second layer comprise the same polymer.

13. The method of claim 1, wherein phase inversion is not performed between steps (i) and (ii).

14. The method of claim 1, wherein the unreacted portion of the viscous polymer solution is also an unprecipitated portion.

* * * * *